(No Model.)

S. KNOWLES.
BELT COUPLING.

No. 586,338. Patented July 13, 1897.

WITNESSES
C. D. Kesler
[signature]

INVENTOR
Sam Knowles.
By John Wedderburn
Attorney

THE NORRIS PETERS CO., PHOTO-LITHO., WASHINGTON, D. C.

UNITED STATES PATENT OFFICE.

SAM KNOWLES, OF GIBBSVILLE, WISCONSIN.

BELT-COUPLING.

SPECIFICATION forming part of Letters Patent No. 586,338, dated July 13, 1897.

Application filed March 2, 1897. Serial No. 625,775. (No model.)

*To all whom it may concern:*

Be it known that I, SAM KNOWLES, a citizen of the United States, residing at Gibbsville, in the county of Sheboygan and State of Wisconsin, have invented certain new and useful Improvements in Belt-Couplings; and I do hereby declare the following to be a full, clear, and exact description of the invention, such as will enable others skilled in the art to which it appertains to make and use the same.

My invention has for its object the production of a simple and efficient construction of belt-fastener for securing together the meeting ends of a belt and which entirely dispenses with piercing the belt and passing pins or laces therethrough, whereby the strength of the belt is not impaired.

To this end my invention consists in providing a locking or fastening frame having fixed transversely-arranged clamping-bars provided with corrugated or serrated faces and a clamping-bar sliding on flanges in said frame and acting, in conjunction with the said fixed bars, to clamp the belt ends between them in order to insure a firm connection between the belt ends.

Figure 1:
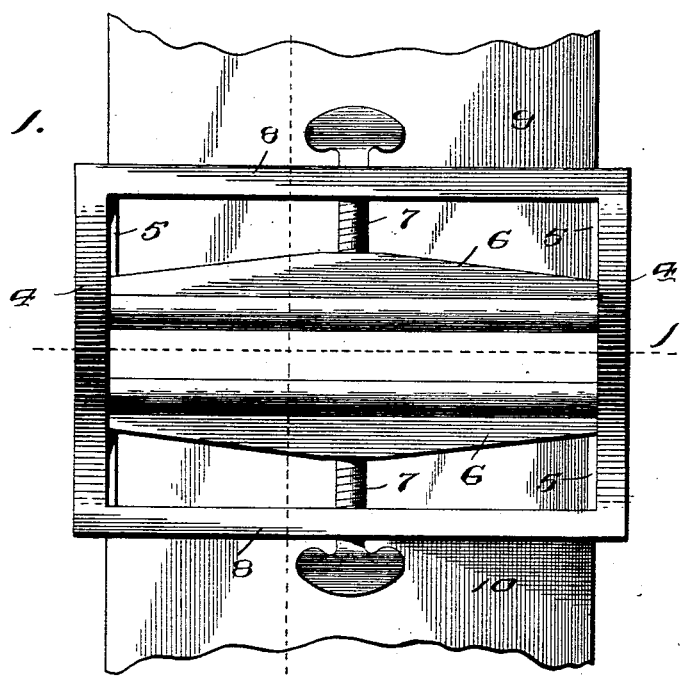
Figure 2:
Figure 3:
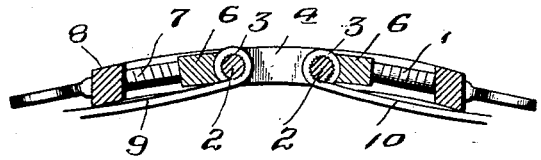

In the accompanying drawings, forming a part of this application, Figure 1 is a plan view showing my invention applied to and connecting together the two meeting ends of a belt. Fig. 2 is a cross-section view on the line 2 2 of Fig. 1. Fig. 3 is a longitudinal sectional view on the line 3 3 of Fig. 1.

Referring to the drawings, the numeral 1 designates the locking-frame, which may be constructed of metal or other suitable material, but is shown in the present instance as rectangular in form. This frame is provided adjoining each side with longitudinally-extending fixed circular clamping rods or bars 2, having their faces 3 serrated or corrugated, as shown. Connected with the end bars 4 of the rectangular frame are inwardly-projecting slide-flanges 5, on which adjustable clamping-bars 6 are adapted to move, so as to be brought into and out of engagement with the fixed clamping-rods 2. An adjusting-screw or set-screw 7 projects through threaded openings in the end bars 8 of the flange and is connected with the said movable clamping-bars and adapted to move the same relatively to the fixed clamping-rods, as will be readily understood.

In practice the two meeting or adjoining ends 9 10 of the belt are passed around the two fixed clamping-rods 2, and then the sliding clamping-bars 6 are forced into contact therewith, so as to clamp the extremities of the said belt ends firmly against the corrugated or serrated inner faces of the said fixed clamping-rods. By this construction piercing of the belt and connection of the meeting ends thereof by laces or pins are entirely dispensed with, and thus the belt is not weakened or impaired in any way.

Having thus described my invention, what I claim as new, and desire to secure by Letters Patent, is—

1. In a belt-fastener, the combination of a frame provided with two longitudinally-extending parallel clamping-rods, two movable or sliding clamping-bars adapted to clamp the meeting ends of the belt against the said fixed rods, and set-screws for adjusting said movable bars, substantially as described.

2. In a belt-lock, the combination with the belt ends, of a belt lock or fastener comprising a rectangular frame having two longitudinally-extending fixed clamping-rods which are parallel with each other and spaced apart and provided with teeth and serrations on the inner side thereof, two movable clamping-jaws sliding on flanged guides projecting from the end bars of the frame and adapted to clamp the extremities of the belt ends against the serrated faces of the fixed clamping-rods, and set-screws movable in threaded openings in the side bars of the frame and connected with the said movable clamping-bars and adapted to effect the adjustment of the same, substantially as described.

In testimony whereof I have signed this specification in the presence of two subscribing witnesses.

SAM KNOWLES.

Witnesses:
PETER DAANE,
H. W. PIETERPOL.